United States Patent [19]
Graham

[11] Patent Number: 4,589,704
[45] Date of Patent: May 20, 1986

[54] AIR BRAKE WITH COLLET LOCKED PUSH ROD AND AIR SUPPLY SYSTEM

[76] Inventor: John M. Graham, 820 N. Delaware St. #308, San Mateo, Calif. 94401

[21] Appl. No.: 638,441

[22] Filed: Aug. 7, 1984

[51] Int. Cl.$^4$ .................... B60T 13/22; F16D 65/24
[52] U.S. Cl. ........................... 303/6 M; 92/24; 92/27; 188/67; 188/265; 303/13; 303/71
[58] Field of Search .................... 188/265, 67, 72.3; 303/71, 84, 6 M, 89, 13-14, 28, 7, 9, 8, 57-67, 68-69, 80; 92/24, 25, 26, 27, 28, 29, 17

[56] References Cited

U.S. PATENT DOCUMENTS

| | | | |
|---|---|---|---|
| 3,228,729 | 1/1966 | Schubert | 303/9 |
| 3,285,672 | 11/1966 | Avrea | 303/71 X |
| 3,294,455 | 12/1966 | Valentine | 303/13 X |
| 3,443,839 | 5/1969 | Hinrichs et al. | 303/9 X |
| 3,508,794 | 4/1970 | Engle | 188/265 X |
| 3,713,702 | 1/1973 | Campanini | 303/9 |
| 4,407,548 | 10/1983 | Graham | 303/6 M |

OTHER PUBLICATIONS

MINI-MAX sales brochure, International Transquip Industries, Inc., 16910 Texas Avenue, Webster, Texas 77598.

Bendix, Service Data for Model SD-02-4.

Primary Examiner—Douglas C. Butler
Attorney, Agent, or Firm—Townsend and Townsend

[57] ABSTRACT

An air brake includes a service brake chamber which actuates a push rod. A collet brake chamber is partially defined by a collet brake diaphragm. A locking collet is mounted to the collet brake diaphragm and includes a bore through which the push rod passes. A collet brake spring biases the collet into a tapered collet hole to clamp the collet onto the push rod to prevent the movement of the push rod toward the brake off position. Application of pressure to the collet brake chamber overcomes the force of the collet brake spring and moves the collet away from the tapered collet hole to allow the push rod to move freely. An air supply system, including a quick release valve, a two way check valve, an emergency and parking air supply tank and a pilot check valve, in conjunction with a conventional quick release valve or another type of exhaust valve, automatically supplies air to the service brake chamber from the tank whenever the spring brake supply line is vented. The air supply system can also be used with conventional air brakes.

24 Claims, 6 Drawing Figures

AIR BRAKE WITH COLLET LOCKED PUSH ROD AND AIR SUPPLY SYSTEM

BACKGROUND OF THE INVENTION

Trucks, as well as other large vehicles, generally use air brakes for stopping for both the tractor and the trailer. Air brakes include a service brake chamber which drives a push rod into a brake on position when air is applied to the service brake chamber. For parking purposes, a dual chamber air brake is often used. These dual chambered brakes include both a service brake chamber, for applying the brakes during normal operation, and what is called a spring brake chamber. The spring brake chamber includes a relatively heavy spring connected to the push rod. The spring is compressed only when air from a spring brake line is applied to the spring brake chamber. When the air in the spring brake chamber is vented, the spring brake spring drives the push rod to a brake on position. Thus, when a truck is parked and the air in the brake chambers is vented, the service brake chamber no longer actuates the brakes but the spring brake spring pushes the push rod into a spring brake on position thus applying the brakes.

Conventional dual chamber brakes can only be made so that the braking force applied by the spring brake spring is only about half of the braking force applied by the pressurization of the service brake chamber. This has made the use of the legal parking brake inadequate for emergency braking requirements, and has limited its effective usage to parking brake requirements only. The rationale for this seemingly defective design is that the spring brake chamber may be vented while the service brake chamber is pressurized; when this occurs the total force on the brake is greater than that of the service brake alone. If the spring brake spring were made large enough to equal the force resulting from the pressurization of the service brake chamber, the force applied to the brakes would be about double that applied by the service brakes alone. This excess loading may lead to cracked drums and other premature failure. Thus the spring brake force is necessarily and commonly limited to about 50% of the service brake force. Recently there are means available to prevent the compounding of the service and parking brakes forces. See U.S. Pat. No 4,407,548.

At present, there are no statutes which provide for emergency brakes for air braked vehicles. There are statutes which govern parking brakes, and air braked vehicles must have them. The USA, Asia and Europe have accepted the spring brake for parking brake requirements only and have not yet specified it for any emergency brake requirements. Since something is better than nothing, the trucking industry uses their legal parking brake for emergency situations because nothing else exists for them to use, if the service brakes fail when a vehicle is in motion. However, because of the limited stopping power of spring brakes, and since they are usually not used on all braked wheels, they are not effective replacements for the service brakes which are designed to stop a vehicle in motion.

The Bendix Corporation of Southfield, Michigan sells two models of air brakes, identified as DD-3 and SD-3 safety actuators, with mechanically locked push rods. The Bendix safety actuators include a number of rollers wedged by a spring between the push rod and an inclined collar ramp. During normal running conditions, that is when the spring brake line is pressurized, air pressure in the spring brake line pushes a piston against the rollers to move the rollers up the ramp so that the rollers move away from the push rod. When the spring brake line is vented, such as when parked, the piston returns allowing the rollers, under the influence of the spring, to be wedged against the collar ramp and the push rod; this locks the push rod in place.

When using the Bendix safety actuator, the brakes do not release by normal means. That is, people in the trucking industry are used to having the parking brakes release when the air pressure comes up. However, with the Bendix safety actuators, one cannot always release the parking brake unless an application of the service brake is also made. Also, application of the Bendix safety actuators requires that the vehicle's service brakes bring the vehicle to a stop before their application. Therefore, the Bendix safety actuators are usable only for parking, not emergency purposes, if a vehicle's service brake is unable to stop the vehicle while moving. The Bendix actuator is complex, requires many precision machined parts and needs perfect seals. It is thus quite expensive. At present the only equipment of which applicant is aware using the DD-3 and SD-3 are GMC transit buses. These drawbacks may account for the limited acceptance the Bendix safety actuators have achieved.

International Transquip Industries, Inc. of Houston, Texas sells an air activated mechanically held brake under the trademark Mini-Max. The brake is used with a conventional relay emergency valve for emergency application. For parking, serrations on the push rod are engaged by the serrated end of a piston to lock the push rod in place. This occurs when air pressure in the emergency tank is lost. Because of the loads and the environment encountered during use, it is expected that the serrated members would need to be made of expensive metals to achieve long life for this combination service and parking brake.

SUMMARY OF THE INVENTION

The present invention provides a pressurized fluid actuated brake, particularly useful as an air brake for trucks, which is simple and rugged in construction. Another aspect of the invention provides an air supply system for allowing the automatic activation of the service brakes in the event of loss of pressure in a vehicle's air supply line, such as if the trailer breaks loose from its tractor.

An air brake made according to the invention includes a service brake chamber and a collet brake chamber. When the service brake chamber is pressurized, a push rod is driven into a brake on position by the pressurized air. When the service brake chamber is vented, the push rod is biased to a brake off position by a return spring. The service brake chamber is partially defined by a service brake diaphragm having an outer surface against which an enlarged, flattened end of the push rod presses.

The housing also includes a collet brake chamber partially defined by a collet brake diaphragm. A locking collet, having a bore through which a portion of the push rod passes, is mounted to the collet brake diaphragm. A collet brake spring biases the collet into a tapered collet hole defined by the housing. This clamps the radially flexible collet fingers against the push rod to halt movement of the push rod toward the brake off position. Application of pressure to the collet brake chamber overcomes the force of the collet brake spring and moves the collet away from the tapered collet hole; this allows the push rod to move freely. The collet brake chamber replaces the spring brake chamber found on conventional dual chambered air brakes. The collet brake chamber is pressurized by what is sometimes called the spring brake supply line or the air supply line in conventional air brake systems; this same line will sometimes be called the collet brake supply line in this application.

Another aspect of the invention relates to an emergency and parking air supply system (E&P system). This aspect of the invention ensures that if pressure is suddenly lost to the collet brake supply line, pressurized air will automatically be applied to the service brake chambers to effectively stop the vehicle even if pressure is also lost in the service brake application line. This aspect of the invention is also usable with conventional service brakes as well.

The E&P system includes an emergency and parking pressurized air storage tank (E&P tank) mounted within the vehicle to be protected, typically a tractor or a trailer. A conventional quick release valve has its inlet connected to the collet brake supply line, its chamber port connected to the E&P tank and its exhaust port connected to an inlet of a two way check valve (TWC valve) via a connecting conduit. Instead of a quick release valve other valves, such as a two way check valve modified to include a spring for normally biasing the sealing member (commonly a ball) toward the inlet connected to the collet brake supply line, can be used. However, a quick release valve is preferably used in this non-standard manner since it is commercially available. The quick release valve and the pilot check valve can be combined into a single valve structure to simplify installation and lower the cost of the system. Initial pressurization of the collet brake supply line fills the E&P tank.

The outlet of the TWC valve is connected to the inlet port of an exhaust valve. The exhaust valve is preferably a quick release valve, but may also be a relay valve or a relay emergency valve, all three being commercially available. The exhaust valve includes one or more chamber ports, connected to one or more service brake chambers, and an exhaust port for venting air in the service brake chambers to atmosphere when the air pressure at its inlet port is released. However, the E&P system can be used without an exhaust valve by allowing the exhaust port of the vehicle's foot valve to vent exhaust air pressure from the vehicle's service brake chambers. It is slower, however. The other inlet of the TWC valve is connected to the service brake application line.

The connecting conduit, and thus the opposed inlet of the TWC valve and exhaust port of the quick release valve, are maintained at atmospheric pressure so long as the collet brake supply line is at an elevated pressure. This permits the unimpeded flow of air pressure from the collet brake supply line and service brake application line to the E&P tank and the exhaust valve, respectively, during normal operation. This is preferably accomplished using a pilot check valve having a control port connected to the collet brake supply line, an inlet opening to the ambient atmosphere and an outlet connected to the connecting conduit. See U.S. Pat. No. 4,407,548. The pilot check valve can be replaced by other valves operating in a similar manner. For example, a pilot bleeder valve made by The Aro Corporation of Byron, Ohio as Model 9600, is much smaller and less expensive than a conventional pilot check valve and can be used instead of the pilot check valve. Pressure at the control port permits the free fluid flow between the pilot check valve inlet and outlet while a reduced pressure at the control port blocks passage of fluid from its inlet to its outlet.

Upon venting of the collet brake supply line, either by design or by accident, high pressure air will be automatically supplied to the service brake chambers via the exhaust valve from the service brake application line, if that is pressurized, or the E&P tank if it is not. In either event full service brake braking force is applied to the push rod to effectively stop the vehicle.

The primary advantage of the collet brake of the present invention is that during emergency braking 100% of the service brake braking force is available for stopping the vehicle. This is quite an improvement over conventional spring brakes which apply only about 50% of the service brake braking force.

Another important advantage is that the braking force applied by the collet is mechanical. That is, the collet brake spring applies a mechanical locking force which locks the collet onto the push rod, thus maintaining the brakes in position. Thus the present invention meets the current U.S. Motor Carrier Safety Regulations for parking brake systems, because when parked, the collet brake spring and collet holds the brake in position using mechanical energy, as opposed to hydraulic, pneumatic, or electrical energy which are illegal for this purpose.

Another advantage of the present invention is that regardless of whether or not the collet is locked on the push rod, the service brakes can always be applied. The force on the push rod applied to the service brake chamber is sufficient to overcome the collet brake spring thus moving the collet out of engagement with the collet hole; once this occurs, the push rod slides within the collet bore to move to the brake applied position.

A further advantage of the present invention arises out of the simplistic and economical nature of the collet locking mechanism used to secure the push rod in place. Once the collet is locked in place, the force of the push rod tends to increase the wedging force applied to the collet thus compounding the wedging force applied by the collet brake spring. Further, the collet is self-aligning within the tapered collet hole to reduce problems caused by cocking of the push rod. Also, the collet can engage a substantial surface area of the push rod so the push rod can be locked within the collet at relatively low surface pressures on the push rod. This reduces surface deformation and wear and therefore promotes smooth operation and long life.

To deactivate conventional spring brakes, the air pressure applied to the spring brake chamber must be sufficient to overcome its heavy duty spring. Thus, at present, it takes time for a tractor's air pressure producing system to generate enough pressure to release the spring brake before a tractor or a trailer can be moved. With the present invention, however, the vehicle can be moved sooner than with conventional spring brakes because first, the collet brake locking spring is much weaker than a conventional spring brake spring, and second, the collet needs only to be moved a short distance to release the push rod, thus allowing the push rod biasing spring to remove the brakes.

The cost of conventional spring brakes is so high that they are only required on one axle of a three axle tractor further reducing the available braking force during emergencies and while parked. An air brake made according to the invention should be able to be manufactured at about the same price or less than commercially available spring brakes. Therefore, a significant cost saving may be realized because fewer units need to be used to obtain equal or greater performance when compared with these conventional brakes. Also, an air brake made according to the invention can be attached to the vehicle's service brake chamber and service brake supply lines in the same manner as conventional dual chambered service and spring brakes to reduce installation problems.

Most tractors and trailers have pressure tanks acting as the pressurized air supply for their spring brakes. In such cases the spring brake air supply tank can be used in lieu of a separate E&P tank; this is an especially, attractive option when retrofitting a tractor's trailer's air brake system with an E&P system of the invention.

A single E&P air supply system can be used to supply several sets of air brakes if desired. One way to do so is to add a TWC valve between the service brake line and each set of service brake chambers (2) one axle on each wheel (1) inlet of each added TWC valve to the exhaust port of the E&P system's quick release valve. This would provide true emergency brakes to the vehicle at low cost.

Many tractors have dual chambered air brakes on only 1 of 3 axles. However, there is often not room to replace the service brakes with dual chambered air brakes. In these cases, adding the E&P system of the invention provides true emergency braking at each wheel at a reasonable cost, something not attainable with dual chambered air brakes.

Other features and advantages of the present invention will appear from the following description in which the preferred embodiments have been set forth in detail in conjunction with the accompanying drawings.

DETAILED DESCRIPTION OF THE PREFERRED EMBODIMENTS

Figure 1:
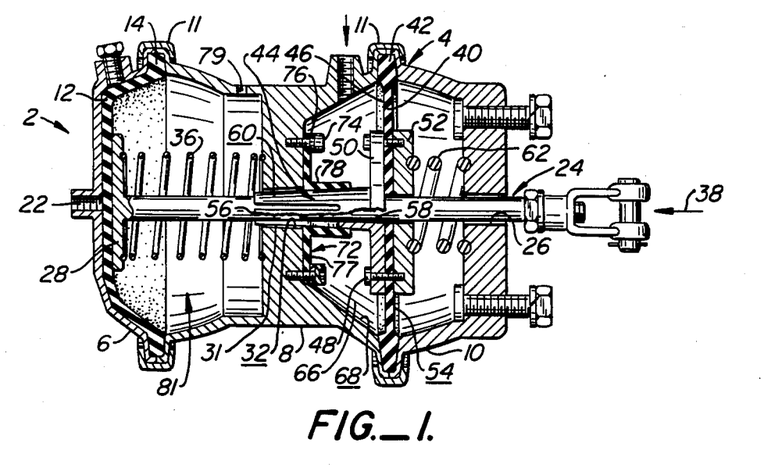
FIG. 1 is a side cross-sectional view of a first embodiment of an air brake made according to the invention with the push rod in the brake off position and the push rod free.
Figure 2:
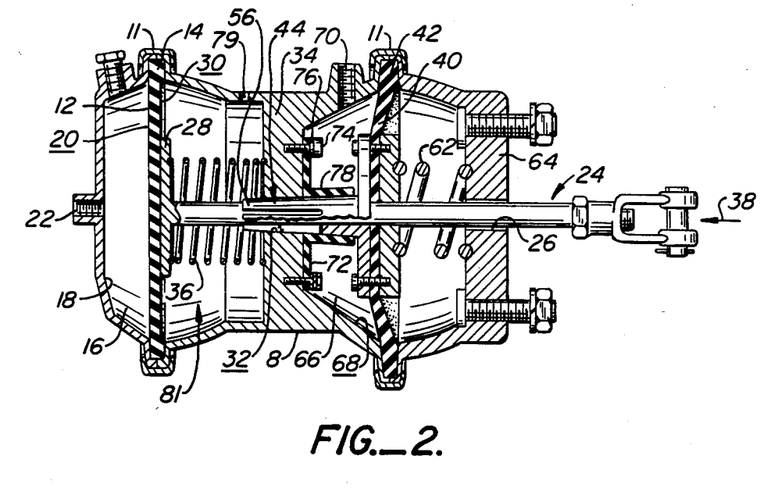
FIG. 2 shows the air brake of FIG. 1 but with the push rod in the brake on position and the push rod locked in position.

Turning now to FIGS. 1 and 2 an air brake 2 includes a housing 4 made up of first, second and third housing portions 6, 8 and 10 secured to one another by clamps 11. A service brake diaphragm 12 is mounted at its peripheral edge 14 between housing portions 6 and 8 to define a service brake chamber 16 between the interior surface 18 of portion 6 and the diaphragm surface 20. A service brake line port 22 allows fluid communication between a service brake line, not shown, and service brake chamber 16.

A push rod 24 passes through an opening 26 in third housing portion 10. Push rod 24 has an enlarged outer end 28 positioned adjacent a surface 30 of diaphragm 12 opposite diaphragm surface 20. Push rod 24 passes through a conical opening 31, defined by a conical surface 32, in a bulkhead 34 of second housing portion 8. A return spring 36 is mounted between outer end 28 and bulkhead 34 to bias push rod 24 in the direction of arrow 38, that is towards the brake off position of FIG. 1. Pressurization of service brake chamber 16 overcomes the relatively weak biasing force of the return spring 36 to force push rod 24 in a direction opposite arrow 38 towards the brake on position of FIG. 2.

A collet brake diaphragm 40 is secured at its peripheral edge 42 between second and third housing sections 8 and 10. A collet 44 is mounted to a surface 46 of diaphragm 40 by a number of screws 48 passing through a circular mounting flange 50 at one end of collet 44, diaphragm 40 and into a mounting ring 52 positioned adjacent the opposite surface 54 of diaphragm 40. Diaphragm 40 supports collet 44 for limited axial movement parallel to push rod 24 and within conical opening 31.

Figure 5:
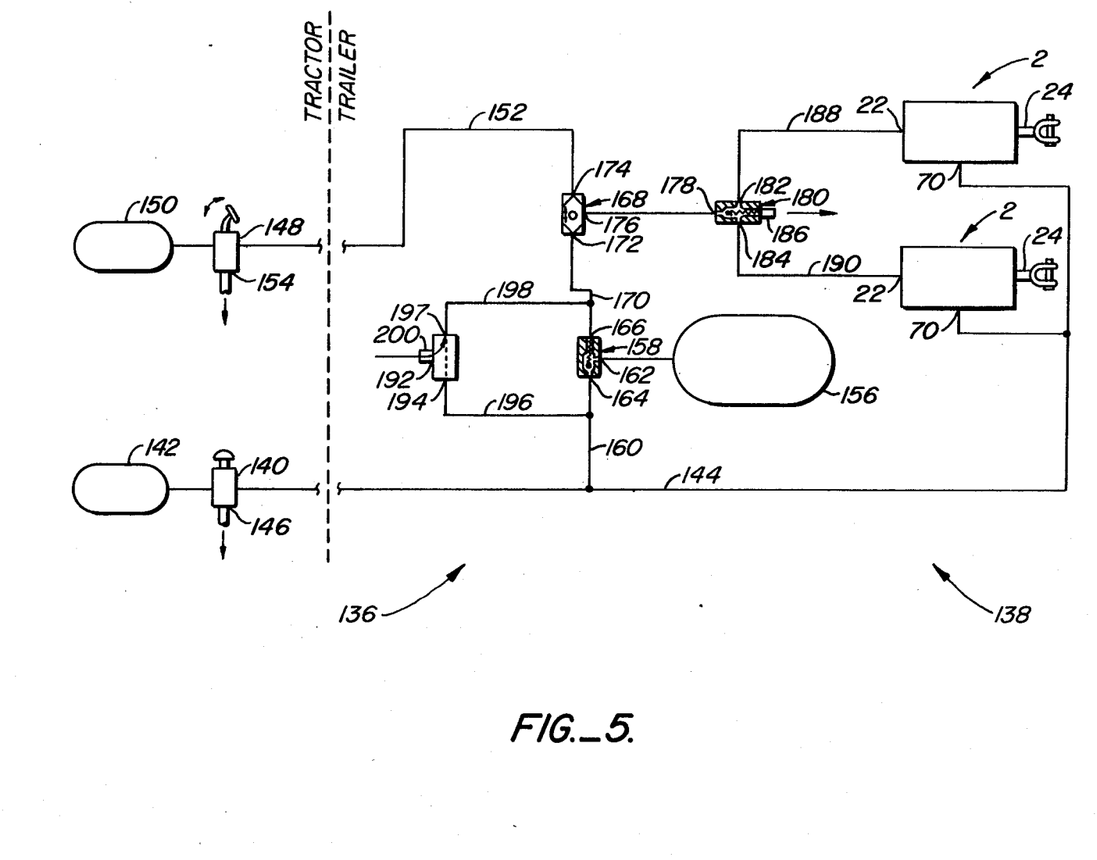
FIG. 5 is a simplified schematic representation of an air brake system incorporating the emergency and parking air supply system of the invention shown used with the air brake of FIG. 1 involving a one axle trailer.

Collet 44 also includes a number of resilient fingers 56 surrounding a bore 58. The outer surface 60 of fingers 56 is tapered at an angle complementary with the taper of conical opening 32. A collet brake locking spring 62 is mounted between the end 64 of third housing portion 10 and mounting ring 52. Locking spring 62 normally biases collet 44 in the direction of arrow 38 so that outer surface 60 is forced against conical surface 32 thus forcing fingers 56 against push rod 24 locking push rod 24 in place. Push rod 24 is released by applying air pressure into a collet brake chamber 66 defined generally between surface 46 of diaphragm 40 and an inner surface 68 of second housing portion 8. Pressurized air is introduced into chamber 66 through a collet brake port 70 which is coupled to a collet brake supply line 144 as shown in FIG. 5. The collet brake supply line corresponds to the spring brake supply line in conventional dual chamber air brake systems. Pressurized air is prevented from escaping between outer surface 60 and conical surface 32 by a generally cylindrical seal 72. Seal 72 is secured to bulkhead 34 by screws 74 passing through a ring retainer 76 and an annular lip portion 77 of seal 72. Pressurizing chamber 66 causes cylindrical portion 78 of seal 72 to press against collet 44 thus sealing chamber 66 while allowing sufficient axial movement of collet 44.

During normal driving, chamber 66 is pressurized so that push rod 24 is free to move. This condition is shown in FIG. 1. Applying pressurized air to port 22 drives push rod 24 in the direction opposite arrow 38 to a brake applying or brake on position. A bleed hole 79 vents a region 81 behind diaphragm 12 to atmosphere. If it is desired to keep the brakes applied, collet brake chamber 66 is vented through port 70 which allows locking spring 62 to force collet 44 against conical surface 32. This is the condition of FIG. 2. Once this occurs the pressure within service brake chamber 16 may be reduced. However, because of the frictional engagement between push rod 24 and collet 44, attempted movement of push rod 24 in the direction of arrow 38 tends to drive the collet further into conical surface 32 thus increasing the frictional engagement between the collet and the push rod. This effectively locks the push rod in place to keep the brakes applied.

If, however, chamber 66 were vented while push rod 24 was in the brake off position of FIG. 1, collet 44 would tend to lock push rod 24 into place, that is in the brake off position. However, upon application of pressure to port 22, service brake chamber 16 becomes pressurized. The force aqainst diaphragm 12 is made to be substantially greater than the force of locking spring 62 so that the application of this pressure to port 22 forces push rod 24 and collet 44 therewith towards the brake applied position, that is in the direction opposite arrow 38. Once collet 44 has moved slightly, the frictional force between the collet and the push rod is reduced sufficiently to allow push rod 24 to move toward the brake on position while sliding through collet 44. Thus, regardless of the presence or absence of pressure applied to collet brake chamber 66, the brakes can always be applied by pressurizing service brake chamber 16.

Figure 3:
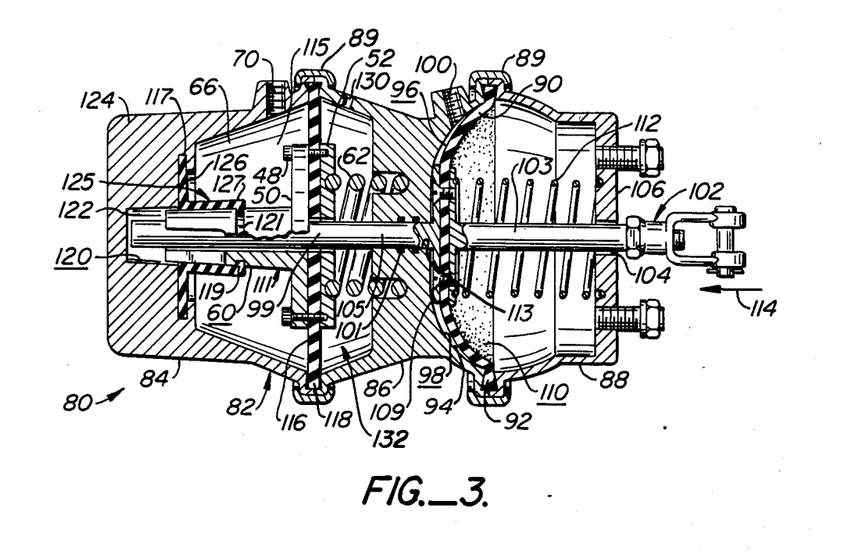
FIG. 3 shows a second embodiment of the air brake of the invention in which the push rod is in the brake off position and the push rod is free.
Figure 4:
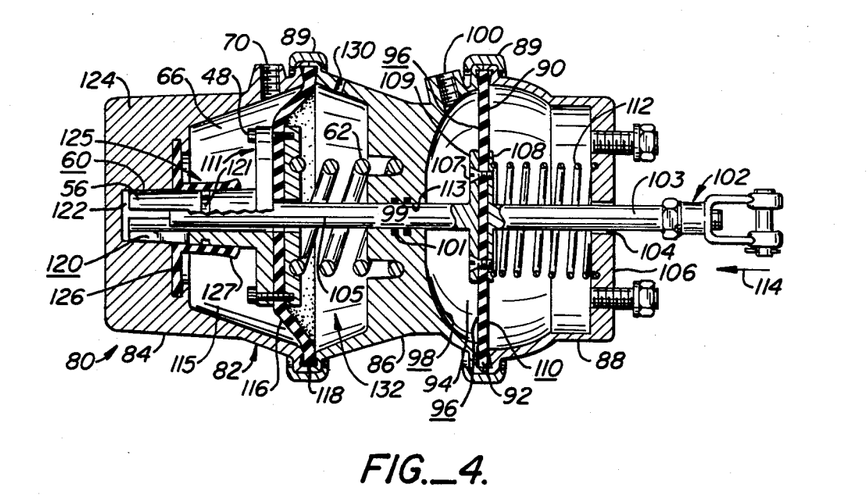
FIG. 4 shows the air brake of FIG. 3 with the push rod in the brake on position and the push rod locked.

Turning now to FIGS. 3 & 4, a second embodiment of the air brake of the invention is shown. Air brake 80 includes a housing 82 comprising first, second and third housing portions 84, 86 and 88 secured to one another by clamps 89. A service brake diaphragm 90 is mounted between second and third housing portions 86, 88 at its peripheral edge 92 to define a service brake chamber 94 between a forward surface 96 of diaphragm 90 and an opposed end surface 98 of second housing portion 86. Pressurized air is introduced into chamber 94 through a service brake port 100. Port 100 is connected to the vehicle's service brake application line, typically through an exhaust valve for more responsive operation.

A push rod 102 is mounted partially within third housing portion 88 through an opening 104 in an end wall 106 of third portion 88. Push rod 102 includes first and second portions 103, 105 secured to one another on either side of diaphragm 90 by screws 107. First portion 103 of push rod 102, like push rod 24 of the embodiment of FIG. 1, has an enlarged end 108 which rests against a surface 110 of diaphragm 90. Second portion 105 has an enlarged end 109 resting against surface 96 of diaphragm 90 and includes an elongate rod 99 which passes through a bore 113 in portion 86. O-ring 101 are mounted within bore 113 contact rod 99 to prevent air from leaking from chamber 94 through bore 113. A return spring 112 biases push rod 102 in the direction of arrow 114, that is towards the brake off position of FIG. 3. Pressurization of chamber 94 forces push rod 102 in the direction opposite arrow 114 to the brake applying or brake on position of FIG. 4.

A collet brake diaphragm 116 is mounted between first and second housing portions 84, 86 at its peripheral edge 118 to partially define a collet brake chamber 115. As can be seen by reference to FIG. 1, air brake 80 and air brake 2 both mount generally similar collets 44, 111 to their respective collet brake diaphragms 40, 116. The only difference is that a groove 121 is formed in the outer surface 60 of collet 111. Elements having the same reference numerals as the embodiment of FIG. 1, such as mounting ring 52 and locking spring 62, are the same and will not be described again.

A seal 125 is mounted about collet 111 and includes an annular lip portion 126 and a cylindrical portion 127. The periphery of annular lip portion 126 is housed within an annular opening 117 in first housing portion 84 so the screws 74 of the embodiment of FIG. 1 are not needed. Also, sealing bead 119 extends inwardly from an end of cylindrical portion 78. Bead 119 fits within complementary groove 121 formed in collet 111. A bleed hole 130 is formed through second housing portion 86 to vent a region 132 to atmosphere. Pressurization of collet brake chamber 115 presses annular portion 126 against housing portion 84 and cylindrical portion 127 against collet 111 thereby sealing chamber 115. This configuration, which eliminates the need for fasteners, aids the assembly of brake 80.

Outer surface 60 of collet 111 engages a conical surface 120 of a conical opening 122 formed in one end of first housing portion 84. Collet brake locking spring 62 biases collet 111 in the direction of arrow 114 so that the outer surface 60 of fingers 56 press against conical surface 120 to force the fingers against a second portion 105 of push rod 102.

Air brake 80 operates in a manner similar to air brake 2. Although the embodiment of FIGS. 3 and 4 appears to be somewhat more complicated than that of FIGS. 1 and 2, it has the advantage that the effective column length of push rod 102 is shorter than that of push rod 24, thus reducing any tendency for the push rod to buckle. However, buckling is minimized in the embodiment of FIG. 1 by the guidance provided by push rod 24 passing through collet 44. Also, the physical size of air brake 80 to the left of O-rings 101 can be made smaller than shown since the force required to secure collet 111 is much less than that required to drive push rod 102. Doing so reduces the size, cost and weight of brake 80. The lowered weight is important since it reduces the cantilever stresses on brake 80.

Referring now to FIG. 5, a further aspect of the invention, an emergency and parking air supply system (E&P system) 136 is shown incorporated into an air brake system 138 for use on trailers. System 138 includes a conventional emergency and parking valve (E&P valve) 140 connected to a first air pressure source 142, both on the tractor. During normal operation E&P valve 140 allows pressurized air from source 142 to be provided to a collet brake supply line 144. Line 144 is connected to port 70 of brake 2 so that during normal operation (such as when the vehicle is moving along a road) collet brake chamber 66 is pressurized. Actuating valve 140 allows the pressurized air within line 144 to be dumped to atmosphere through an exhaust port 146 in valve 140. A conventional pedal valve 148 connects a second pressurized air source 150 to a service brake application line 152 so that pressurized air from source 150 is supplied to line 152 when pedal valve 148 is actuated; pressurized air within line 152 is vented to atmosphere through an exhaust port 154 of valve 148 otherwise.

An emergency and parking pressurized air storage tank (E&P tank) 156 is fluidly connected to collet brake supply line 144 through a conventional single chamber port quick release valve 158 by a conduit 160. Valve 158 includes a chamber port 162 connected to E&P tank 156 and an inlet port 164 connected to conduit 160. Valve 158 also includes exhaust port 166 connected to a first inlet 172 of a TWC valve 168 by a connector conduit 170. Valve 168 includes a second inlet 174 connected to line 152 and an outlet 176 connected to an inlet port 178 of an exhaust valve 180. Exhaust valve 180 is, in the embodiment of FIG. 5, a conventional dual chamber port quick-release valve and includes chamber ports 182, 184 and an exhaust port 186. Valve 180 is constructed so that when pressure is applied to inlet port 178, exhaust port 186 is sealed and pressurized fluid is applied to chamber ports 182, 184. When pressure is removed from inlet port 178, chamber ports 182, 184 are fluidly connected to exhaust port 186 so that pressurized air within chamber conduits 188, 190 which connect chamber ports 182, 184 with service brake chambers 16 of air brakes 2, and thus the air within the service brake chambers, is dumped to atmosphere.

A pilot check valve 192 is mounted across valve 158. Pilot check valve 192 includes a control port 194 fluidly coupled to conduit 160 by a line 196 and an outlet 197 fluidly connected to connecting conduit 170 by a line 198. Valve 192 also includes an inlet 200 open to atmosphere. Valve 192 is preferably of a type disclosed in U.S. Pat. No. 4,407,548 at FIGS. 2A or 2B. Valve 192 is configured to allow fluid to pass generally unimpeded from inlet 200 to outlet 197 regardless of the pressure at control port 194. However, upon application of a predetermined pressure to control port 194, fluid is allowed to pass from outlet 197 to inlet 200 and thus be discharged to atmosphere.

During normal operation of the vehicle collet brake supply line 144 is pressurized sufficiently to apply a first pressure at control port 194 sufficient to allow passage of fluid from outlet 197 to inlet 200; conduit 198 and connecting conduit 170 are thereby vented to atmosphere. When this occurs, air pressure within collet brake supply line 144 flows through inlet port 164, through chamber port 162 and into E&P tank 156 to fill it. Upon actuation of pedal valve 148, which pressurizes application line 152, pressurized air flows from second inlet 174, through outlet 176, through exhaust valve 180 and into service brake chambers 16 of air brakes 2. Both exhaust port 166 and first inlet 172 are sealed because of the high pressure fluid applied to inlet port 164 and second inlet 174. If collet brake supply line 144 is dumped to atmosphere, such as by actuating E&P valve 140 or by a catastrophic event, such as having line 144 rupture, the pressure at control port 194 drops sufficiently to seal outlet 197; at the same time exhaust port 166 opens and inlet port 164 closes so connecting conduit 170 becomes pressurized by the air from E&P tank 156. If service brake application line 152 is at a lower pressure than connecting conduit 170, TWC valve 168 has its second inlet 174 sealed allowing air from E&P tank 152 to pass through first inlet 172, outlet 176 and into inlet port 178 of exhaust valve 180; pressurized air from E&P tank 156 is applied to service brake chambers 16 through ports 22 to apply the brakes.

Figure 6:
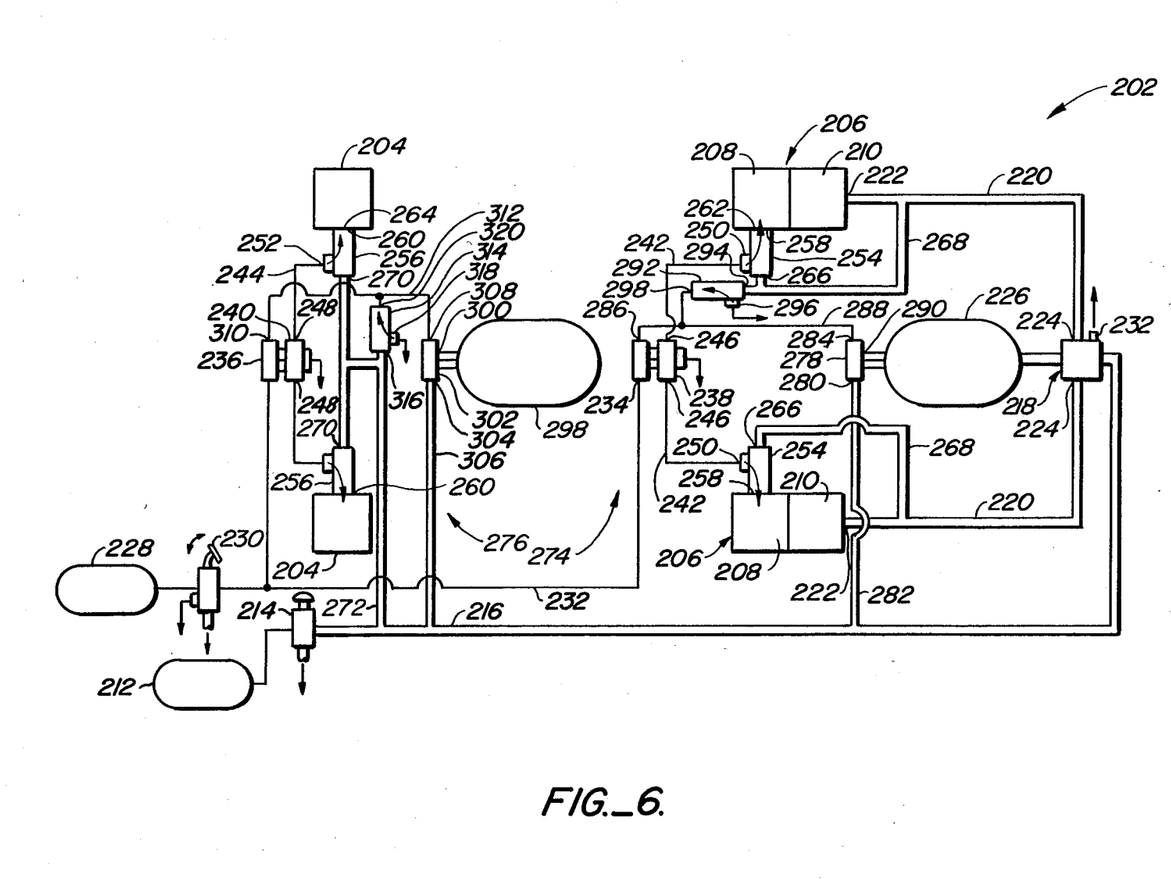
FIG. 6 is a schematic representation of a second air brake system, incorporating the emergency and parking air supply system of FIG. 5, for a two axle air braked tractor using conventional service brakes at one axle and conventional dual chamber air brakes at the other axle.

Referring now to FIG. 6, an air brake system 202 is used with a pair of conventional service brake chambers 204 on one axle and a pair of conventional dual chamber air brakes 206 on the other axle. Dual chamber air brakes 206 each include a service brake chamber 208 and a spring brake chamber 210. Pressurized air is supplied to spring brake chambers 210 from a pressurized air source 212 through a spring brake valve 214, a spring brake supply line 216, a conventional relay valve 218 and lines 220 which connect a spring brake inlet 222 with chamber ports 224 of relay valve 218. Relay valve 218 is, as mentioned above, a type of exhaust valve, and is used to speed up pressurizing and exhausting spring brake chambers 210. To do so, valve 218 is connected to an auxiliary pressurized air supply tank 226. The operation of this valve is conventional and is discussed with reference to FIG. 3 of U.S. Pat. No 4,407,548. When no relay valve 218 is used, tank 226 is not connected to the relay valve 218 and ports 222 are supplied directly.

Service brake chambers 208 and service brakes 204 are supplied pressurized air from a pressurized air source 228 through a pedal valve 230, a service brake application line 232, TWC valves 234, 236 and quick release valves 238, 240. In some cases, quick release valves are not used. Lines 242, 244 connect chamber ports 246, 248 of quick release valves 238, 240 with the inlets 250, 252 of pilot check valves 254, 256. The outlets 258, 260 of valves 254, 256 are connected to chamber ports 262, 264 of service brake chambers 208 and 204 respectively. The control ports 266 of pilot check valves 254 are connected to lines 220 by lines 268 while control ports 270 of pilot check valves 256 are connected to spring brake supply line 216 by a common line 272.

The structure of FIG. 6 thus far described is quite similar to the air brake system shown in FIG. 5 of U.S. Pat. No. 4,407,548 with the exception of the TWC valves 234, 236 and the use of relay valve 218 and tank 226. To ensure the emergency pressurization of service brake chambers 208 and 204, two separate emergency and parking air supply systems (E&P systems) 274, 276 are incorporated into air brake system 202. E&P system 274 includes a quick release valve 278 having an inlet port 280 connected to spring brake supply line 216 by a line 282 and an exhaust port 284 connected to an inlet 286 of TWC valve 234 by line 288. A chamber port 290 of valve 278 is fluidly connected to tank 226 so that tank 226 acts as both a reservoir for the normal pressurization of spring brake chambers 210 and also as an E&P tank for E&P system 274. A pilot check valve 292 is used for the same purpose as pilot check valve 192 of FIG. 5 to ensure that line 288 is maintained at ambient pressure whenever spring brake supply line 216, and thus lines 220, are pressurized. Pilot check valve 292 includes a control port 294 connected to line 268, an inlet 296 connected to ambient atmosphere and an outlet 298 connected to line 288.

Referring now to E&P system 276, an E&P tank 298 is fluidly connected to the chamber port 300 of a quick release valve 302. Valve 302 includes an inlet port 304 fluidly connected to spring brake supply line 216 by a line 306 and an exhaust port 308 fluidly connected to an inlet 310 of TWC valve 236 by a line 312. A pilot check valve 314, used to ensure line 312 is maintained at ambient pressure when line 216 is pressurized, has its control port 316 connected to common line 272, its inlet 318 connected to ambient atmosphere and its outlet 320 connected to line 312.

In use, air brake system 202 normally has line 216 pressurized so that spring brake chambers 210 are pressurized thus permitting brake actuation based on the presence or absence of pressure in service brake application line 232 which is controlled by the actuation of pedal valve 230. Assuming line 216 is pressurized, applying pressure to line 232 causes pressurized air flow through TWC valves 234, 236, quick release valves 238, 240, lines 242, 244 and pilot check valves 254, 256. Since line 220 is pressurized, control ports 266, 270 are supplied with pressurized air sufficient to allow free flow of air between inlets 250, 252, and outlets 258, 260 of pilot check valves 254, 256.

Upon venting spring brake supply line 216 to atmosphere, spring brake chambers 210 are exhausted to atmosphere through their inlets 222, through lines 220 and out the exhaust port 232 of relay valve 218. It should be noted that relay valve 218 does not exhaust the pressurized air within tank 226 when this occurs. This permits spring brake chambers 210 to apply braking force to their associated brakes, not shown, according to the action of their spring brake springs in a conventional manner. Simultaneously, inlet ports 280, 304 of quick release valves 278, 302 are also dumped to atmosphere thus sealing tanks 226, 298 from lines 282, 306 to allow the tanks to pressurize lines 288, 312 respectively. Since line 216 has been dumped to atmosphere, control ports 294, 316 of pilot check valves 292, 314 are also at reduced pressure so that pilot check valves 292, 314 no longer allow air within lines 288, 312 to be exhausted to atmosphere. The high pressure air from tanks 226, 298 is then supplied to service brake chambers 208 and 204 in the same manner as in the embodiment of FIG. 5.

It should be understood that the braking force applied by air brakes 206 will result from both the pressurization of service brake chambers 208 and the spring braking force of spring brakes 210; when existing spring brakes are used this compounding of braking force would need to be considered in designing such a system. This force compounding problem is not present when the E&P systems of the invention are used with conventional single chamber service brakes but result when existing spring brakes are used. Therefore the E&P systems of the invention find their greatest utility when used with air brakes incorporating collet locked push rods according to the invention since full braking force is achieved without the force compounding problem and mechanical energy is used to hold the brakes on if application is made when vehicle is parked or moving.

Modification and variation can be made to the disclosed embodiments without departing from the subject of the invention as defined by the following claims. For example, either or both of the tapered collet and collet hole may have a variable rate of taper rather than the constant rate of taper shown.

I claim:
1. A pressurized fluid actuated brake comprising:
   a brake housing defining a service brake chamber and a collet brake chamber;
   a push rod mounted to the housing for movement between brake on and brake off positions;
   means, including a service brake diaphragm operably coupled to the push rod and responsive to the presence of a pressurized fluid within the service brake chamber, for driving the push rod towards the brake on position when the service brake chamber is at a first pressurized state; and
   collet means, operably coupled to the push rod and responsive to the presence of a pressurized fluid within the collet brake chamber, for selectively restricting movement of the push rod towards the brake off position, said push rod restricting means including:
   a collet having a bore, a radially deflectable portion surrounding at least a portion of the bore, said radially deflectable portion including an external surface;
   said housing defining a collet bore having an internal surface sized and positioned for mating engagemet with said external surface, at least one of siad internal and external surfaces being tapered;
   a collet brake diaphragm partially defining the collet brake chamber;
   means for mounting the collet to the collet brake diaphragm for movement of the collet in response to the presence of pressurized fluid within the collet brake chamber so to bias said collet away from said collet bore to disengage said external and internal surfaces when the collet brake chamber is at a second pressurized state;
   said push rod including a movement limiting bar partially housed within said bore and sized for complementary sliding engagement within the collet bore; and
   spring means for driving the collet into the collet bore when said collet brake chamber is in a third pressurized state to lock the movement limiting bar in place thereby restricting movement of the push rod towards the brake off condition.

2. The brake of claim 1 wherein said first pressurized state is an elevated pressurized state relative to ambient pressure.

3. The brake of claim 1 wherein said second pressurized state is an elevated pressurized state relative to said third pressurized state.

4. The brake of claim 1 wherein said internal and external surfaes are both tapered.

5. The brake of claim 4 wherein said tapered internal and external surfaces have the same taper.

6. The brake of claim 1 wherein said brake on and off positions are respective extended and retracted positions of said push rod.

7. The brake of claim 1 wherein said push rod driving means includes a service diaphragm partially defining said service brake chamber.

8. The brake of claim 7 wherein said push rod has an inner end abutting said service diaphragm whereby when the service brake chamber is in the first pressurized state said service diaphragm deflects said push rod to the brake on position.

9. The brake of claim 8 wherein said inner end has an enlarged flattened portion abutting the service diaphragm.

10. The brake of claim 1 further comprising a push rod biasing spring mounted within the housing and arranged and adapted to bias the push rod towards the brake off position.

11. The brake of claim 9 further comprising a push rod biasing spring mounted within the housing between an internal housing surface and the enlarged flattened portion of the push rod.

12. The brake of claim 1 wherein said movement limiting bar is an intermediate portion of said push rod.

13. The brake of claim 9 wherein said movement limiting bar is an intermediate portion of said push rod.

14. The brake of claim 8 wherein said push rod includes a first portion one one side of said service diaphragm and a second portion on the other side of said service diaphragm, said first and second portions secured to one another to capture said service diaphragm therebetween.

15. The brake of claim 1 wherein said collet biasing means further comprises a collet brake diaphragm partially defining said collet brake chamber and means for mounting said collet to said collet brake diaphragm so said collet moves with said collet brake diaphragm.

16. The brake of claim 15 wherein said collet driving spring means includes a spring mounted on the side of the diaphragm opposite the collet.

17. A pressurized fluid actuated brake comprising:
a housing defining a service brake chamber and a collet brake chamber fluidly coupled to respective service brake and collet brake ports;
a push rod mounted to said housing for movement between brake on and brake off positions;
means for normally biasing said push rod toward the brake off position;
service brake diaphragm means, operably coupled to said push rod and responsive to the fluid pressure within said service brake chamber, for driving the push rod towards the brake on position when pressurized fluid is applied to the service brake chamber;
said housing defining a tapered collet hole bounded by an internal surface with a first chosen taper;
a locking collet having an internal bore sized for complementary sliding engagement over said push rod, a portion of the collet having a tapered external surface within a second chosen taper, said portion including axially segmented portions;
a collet brake diaphragm mounted to the housing and partialy defining the collet brake chamber;
means for mounting said collet to the collet brake diaphragm for movement of the collet in response to the fluid pressure within the collet brake chamber so to drive the collet out of engagement with the collet hole internal surface when pressurized fluid is applid to the collet brake chamber;
spring means for normally biasing said collet into engagement with said tapered colet hole so the tapered external collet surface and tapered collet hole internal surface are forced against one another to bias the collet segmented portions against the push rod to keep the push rod from moving from the brake on to the brake off position; and
whereby the push rod is free to move between brake on and brake off positions when pressurized fluid is applied to the collet brake chamber and the push rod is locked in position when pressurized fluid is removed from the collet brake chamber.

18. A pressurized fluid actuated brake comprising:
a housing defining a service brake chamber and an collet brake chamber fluidly coupled to respective service brake and collet brake ports;
a service brake diaphragm and a collet brake diaphragm mounted within said housing and partially defining said service brake and collet brake chambers respectively;
a push rod mounted to said housing for movement between brake on and brake off positions, said push rod having a first portion housed within said housing configured for operable engagement with a first side of said service brake diaphragm, said service brake diaphragm arranged and adapted to drive the push rod first portion towards the brake on position when pressurized fluid is applied to the service brake chamber;
means for normally biasing said push rod first portion toward the brake off position;
a second push rod portion, including an elongate rod portion and an end secured to said first push rod portion with said service brake diaphragm therebetween;
said housing defining a tapered collet hole bounded by an internal surface with a chosen taper;
a locking collet mounted to said collet brake diaphragm, said collet and collet brake diaphragm arranged and adapted to drive the collet out of engagement with the collet hole internal surface when pressurized fluid is applied to the collet brake chamber, said collet having an internal bore sized for complementary sliding engagement over said elongate rod portion of said second push rod portion, a portion of the collet having a tapered external surface with said chosen taper, said collet portion including radially movable segments; and
spring means for normally biasing said collet into engagement with said tapered collet hole so the tapered external collet surface and the tapered collet hole internal surface are forced against one another to bias the collet segments against the elongate rod portion to keep the elongate rod portion from moving from the brake on to the brake off position;
whereby the push rod is free to move between brake on and brake off positions when pressurized fluid is applied to the collet brake chamber and the push rod is locked in position when pressurized fluid is removed from the collet brake chamber.

19. An emergency and parking brake air supply system for use with air brake systems of the type including a brake chamber operably coupled to a brake to apply the brake when the brake chamber is pressurized, a service brake application line and a spring brake supply line, the system comprising:
a pressure storage tank;
a quick release valve including an inlet port, an exhaust port and a chamber port, said chamber port fluidly coupled to said tank and said inlet port fluidly connected to the spring brake supply line;
a two way check valve including first and second inlets and an outlet, said first inlet fluidly connected to said exhaust port by a connection conduit and said second inlet fluidly connected to said service brake application line;
an exhaust valve including an exhaust valve inlet port fluidly connected to said two way check valve outlet, an exhaust valve chamber port fluidly connected to said brake chamber and an exhaust valve exhaust port fluidly connected to the ambient atmosphere; and
a valve including a valve control port fluidly connected to said spring brake supply line, a valve outlet fluidly connected to said connection conduit and a valve inlet fluidly connected to the ambient atmosphere, said valve arranged and adapted to block fluid flow from said valve outlet to said valve inlet only when pressurized fluid below a first pressure is applied to said valve control port and to vent the connection conduit to atmosphere when the pressure at said valve control port is above a second pressure;
whereby venting said inlet port and said second inlet causes pressurized air within said tank to flow through said quick release valve, through said connection conduit, through said two way check valve, through said exhaust valve and to the brake chamber.

20. The system of claim 19 wherein said valve is a pilot check valve arranged and adapted to permit generally free flow of fluid from said inlet to said outlet at all times.

21. An air brake system of the type including service brake and spring brake air supply sources, service brake and spring brake control valves fluidly connecting the service brake and spring brake air supply sources to a service brake application line and a spring brake supply line, a service brake including a service brake chamber operably coupled to a brake to apply the brake when the service brake chamber is pressurized, the system comprising:
    an air supply system operably coupling said service brake chamber to the service brake air supply line comprising:
        a pressure storage tank;
        a quick release valve including an inlet port, an exhaust port and a chamber port, said chamber port fluidly coupled to said tank and said inlet port fluidly connected to the spring brake supply line;
        a two way check valve including first and second inlets and an outlet, said first inlet fluidly connected to said exhaust port by a connection conduit and said second inlet fluidly connected to said service brake application line;
        an exhaust valve including an exhaust valve inlet port fluidly connected to said chamber port, an exhaust valve chamber port fluidly connected to said service brake chamber and an exhaust valve exhaust port fluidly connected to the ambient atmosphere; and
        a valve including a valve control port fluidly connected to said inlet port, a valve outlet fluidly connected to said connection conduit means and a valve inlet fluidly connected to the ambient atmosphere, said valve arranged and adapted to block fluid flow from said valve outlet to said valve inlet only when pressurized fluid below a first pressure is applied to said valve control port so to vent the connection conduit to atmosphere when the pressure at said valve control port is above a second pressure;
        whereby venting said inlet port and said second inlet causes pressurized air within said tank to flow through said quick release valve, through said connection conduit, through said two way check valve, through said exhaust valve and to the service brake chamber.

22. The system of claim 21 wherein said valve is a pilot check valve arranged and adapted to permit generally free flow of fluid from said inlet to said outlet at all times.

23. The system of claim 21 wherein said air brake includes a spring brake chamber fluidly connected to the spring brake supply line.

24. The system of claim 21 further comprising a collet air brake including:
    a brake housing defining and a collet brake chamber, said collet brake chamber being fluidly connected to the spring brake supply line;
    a push rod mounted to the housing for movement between brake on and brake off positions;
    means, operably coupled to the push rod and responsive to the presence of a pressurized fluid within the service brake chamber, for driving the push rod towards the brake on position when the service brake chamber is at a first pressurized state; and
    collet means, operably coupled to the push rod and responsive to the presence of a pressurized fluid within the collet brake chamber, for selectively restricting movement of the push rod towards the brake off position, said push rod restricting means including:
        a collet having a bore, a radially deflectable portion surrounding at least a portion of the bore, said radially deflectable portion including an external surface;
        said housing defining a colet bore having an internal surface sized and positioned for mating engagement with said outer surface, at least one of said internal and external surfaces being tapered;
        means, responsive to the presence of pressurized fluid within the collet brake chamber, for biasing said collet away from said collet bore to disengage said external and internal surfaces whe the collet brake chamber is at a second pressurized state;
        said push rod including a movement limiting bar, partially housed within said bore and sized for complenetary sliding engagement within the collet bore; and
        spring means for driving the collet into the collet bore when said collet brake chamber is in a third pressurized state to lock the movement limiting bar in place thereby restricting movement of the push rod towards the brake off condition.

* * * * *